United States Patent [19]
Bundschuh et al.

[11] 3,834,798
[45] Sept. 10, 1974

[54] VIEWING SCREEN FOR MOTION PICTURE PROJECTORS

[76] Inventors: John J. Bundschuh; William H. Goddard, both of 901 Elmgrove Rd., Rochester, N.Y. 14650

[22] Filed: Dec. 20, 1972

[21] Appl. No.: 316,777

[52] U.S. Cl. .................... 352/104, 352/242, 353/79
[51] Int. Cl. ............................................ G03b 21/10
[58] Field of Search ........ 352/104, 242; 353/74, 75, 353/76, 77, 78, 79

[56] References Cited
UNITED STATES PATENTS

| | | | |
|---|---|---|---|
| 2,322,023 | 6/1943 | Hopkins | 352/104 |
| 2,624,232 | 1/1953 | Kingston | 352/72 |
| 3,310,360 | 3/1967 | Jarvis et al. | 352/242 X |
| 3,387,535 | 6/1968 | Bennett | 353/78 X |
| 3,560,088 | 2/1971 | Schwartz | 353/78 |
| 3,582,195 | 6/1971 | Pignone | 352/104 X |
| 3,695,746 | 10/1972 | Youngblood | 352/104 X |

*Primary Examiner*—Samuel S. Matthews
*Assistant Examiner*—Alan Mathews
*Attorney, Agent, or Firm*—W. H. J. Kline

[57] ABSTRACT

A slide-out viewing screen for a motion picture projector. A slidable frame is carried by the projector and a negative lens, mirror and rear projection viewing screen are mounted on the frame. The negative lens and the mirror are pivotably supported by the frame and are movable from a stored position to an operative position when the frame is moved from a stored position to a viewing position. Through an interaction between the mirror and the negative lens and the projector housing, the mirror and negative lens will be positioned in their stored position when the frame is in its stored position.

9 Claims, 4 Drawing Figures

VIEWING SCREEN FOR MOTION PICTURE PROJECTORS

BACKGROUND OF THE INVENTION

1. Field of the Invention

This invention relates to motion picture projectors and more particularly to slide-out personal viewing screens for motion picture projectors.

2. Description of the Prior Art

In the amateur movie film field it has long been desired to provide an apparatus to enable the photographer to view his film for previewing purposes without necessitating the use of standard projection techniques onto a remote screen. Two general approaches have been adopted in order to accomplish this end; first, the provision of an independent viewing screen selectively attached to the projector or second, the provision of a selectively activated viewing screen integral with the projector. Independent viewing screen attachments, as shown for example in U.S. Pat. No. 3,094,037 in the name of Capalo, generally compirse a mirror, lens and projection screen in a unitary housing which is adapted to be selectively attached to a standard projector. These attachment screens are relatively simple in construction but have the distinct disadvantage that they are auxiliary pieces of equipment which require separate maintenance and storage. Integral viewing screens, while overcoming the disadvantages found in independent attachments have materially complicated and add to the bulk of the standard projector with which they are associated requiring complex optical systems, as shown for example in U.S. Pat. No. 2,032,116 in the name of Conrad et al., or U.S. Pat. No. 3,159,841 in the name of Castedello et al.

SUMMARY OF THE INVENTION

It is an object of this invention to provide a personal viewing screen of simple construction for a standard motion picture projector, which will enable the projector to be used selectively as a personal viewer or according to standard projection techniques onto a remote screen.

It is further an object of this invention to provide a personal viewing screen for a motion picture projector, the personal viewing screen being a compact self-contained unit which is stored within the projector housing when not in use.

Another object of this invention is to provide a slide-out personal viewing screen having its own optical path altering structure such that no additional lens or mirror structure need be supplied, the optical path altering structure being automatically positioned for projecting the movie film image on the personal viewing screen when the screen is moved to its operative position.

In order to accomplish the above, there is herein provided a slidable frame carried by the projector upon which frame there is mounted a negative lens, a mirror and a rear projection viewing screen. The negative lens and mirror are pivotably supported by the frame and are movable from a stored position to an operative position when the frame is moved from a stored position to a viewing position. Further, through an interaction between the mirror and the negative lens and the projector housing, the mirror and negative lens will be positioned in their stored position when the frame is returned to its stored position.

DESCRIPTION OF THE PREFERRED EMBODIMENT

Figure 1:
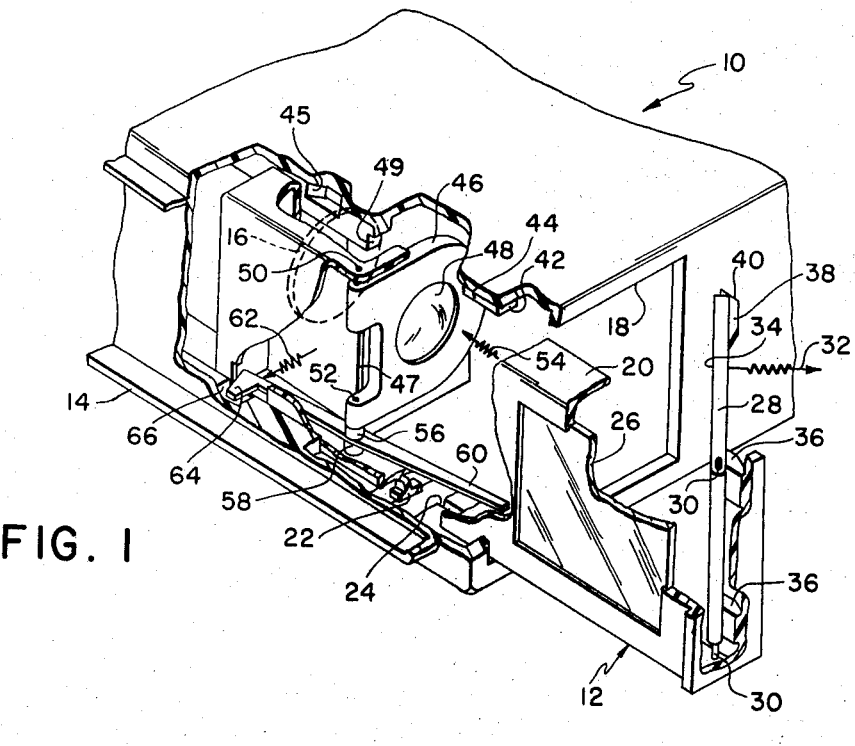
FIG. 1 is a perspective view, partly in section, of the motion picture projector and slide-out personal viewing screen according to this invention, the viewing screen being in its fully extended viewing position.

Referring now to the drawings, FIG. 1 shows a projector 10 having a compact personal viewing screen assembly 12 of the slide-out type to be more fully described hereinbelow. The projector 10 has a housing 14 within which there is contained the necessary projection equipment (film reels, drive, projection lamp, etc. not shown) and a projection lens 16 of any desired configuration forming no part of this invention. The projector 10, in a well known manner, may selectively project a motion picture film onto a remote screen through an opening 18 in the housing 14.

The personal viewing screen assembly 12 for selectively altering the standard remote projection techniques to a personal viewing technique has a frame 20 which is slidably supported within the housing 14 and extends through the opening 18 out of the path of projection from the projection lens 16. The slidable connection between the frame 20 and the housing 14 is accomplished by a T-shaped projection 22 extending rom the lower side of the frame 20, the projection 22 riding in a T-shaped slide groove 24 integrally formed within the housing 14. The slidable movement of the frame 20 permits the personal viewing screen assembly 12 to be selectively moved from a fully retracted stored position (see FIG. 4) to a fully extended viewing position (see FIGS. 1 and 2).

Figure 3:
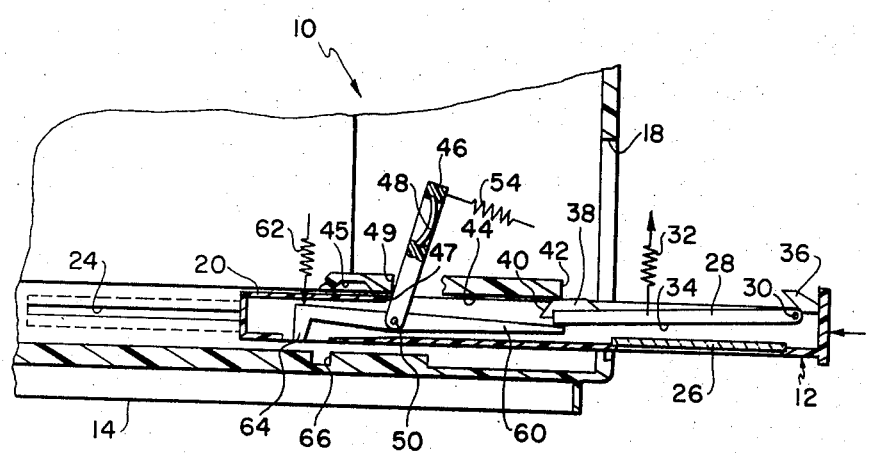
FIG. 3 is a plan sectional view similar to that of FIG. 2 with the viewing screen being moved to an intermediate position.
Figure 4:
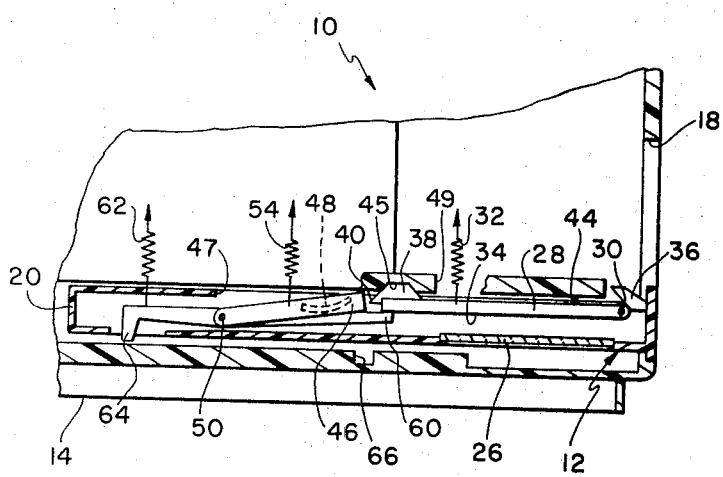
FIG. 4 is a plan sectional view similar to that of FIG. 2 with the viewing screen being moved to its fully retracted stored position.

At the forward end of the frame 20 there is located a rear projection viewing screen 26 upon which the motion picture images may be projected in a manner to be explained hereinbelow. Adjacent the rear projection viewing screen 26 is a mirror 28 which is pivotably mounted to the frame 20 by means of pivot pins 30. The mirror 28 is biased by means of a suitable spring biasing member, shown schematically as numeral 32 (may in fact be a torsion spring at the pivot), to a reflective position in the projection path wherein the images projected by the projection lens 16 will be reflected from a reflective surface 34 of the mirror 28 onto the viewing screen 26. The location of the mirror 28 (such that the reflective angle will place the image on the viewing screen 26) is accomplished by means of the stops 36 fixed to the frame 20 which limit the movement of the mirror by the biasing means 32. Along the upper rear surface of the mirror 28 is a protrusion 38 having forward guide surface 40. The forward guide surface 40 is positioned so as to be engageable with the guide surface 42 of the protrusion 44 formed integrally with the housing 14 so as to locate and guide the mirror 28 during retraction of the personal viewing screen assembly 12 to its stored position (see particularly FIGS. 2–4). The protrusion 38 is adapted to engage a complementary shaped notch 45 formed in the protrusion 44 to latch the personal view screen assembly 12 in its stored position when the screen has been fully retracted (FIG. 4).

Figure 2:
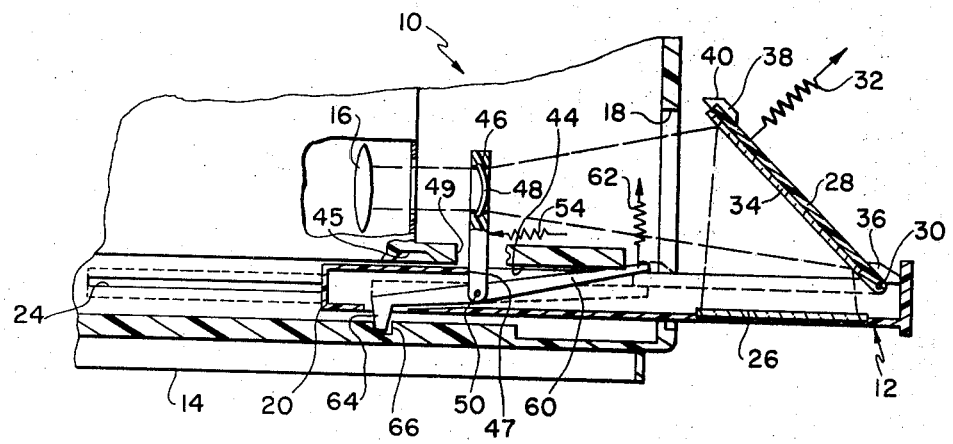
FIG. 2 is a plan view in section of the viewing screen according to this invention, the viewing screen being in its fully extended viewing position.

The frame 20 additionally supports a lens carrier 46 which has positioned therein a negative lens 48 for magnifying the projected image of the motion picture film so as to cause the projected image to be enlarged to fill the screen 26. The lens holder 46 is pivotably supported by the frame 20 by means of pivot pins 50 and 52. A spring biasing means, shown schematically as numeral 54, biases the lens holder 46 to its operative position. A stop 47 integral with the frame 20 limits the movement of the lens holder 46 to control the operative position thereof (FIGS. 1 and 2). An abutment 49 integral with the protrusion 44 engages the lens holder 46 to interact therewith (FIG. 3) to move the holder 46 to its stored position (FIG. 4). The vertical position of the lens holder 46 is controlled by the spacers 56 and 58 to place it in its correct vertical position. The vertical spacers 56 and 58 also serve to vertically locate a latching lever 60 which is pivotally mounted about pivot pin 52 and biased to a latching position by a spring biasing member, indicated schematically as numeral 62. The latching lever 60 has a prong 64 which engages a notch 66 when the personal viewing screen 12 is in its operative position to retain the screen in that position (see FIGS. 1 and 2).

With the invention thus described, the operation of the invention is as follows: During the conventional remote projection mode of operation for the projector 10, the personal viewing screen assembly 12 is conveniently located in its compact fully retracted stored position as shown in FIG. 4. When it is desired by the operator to view the motion picture film without projecting to a remote screen, the operator may move the personal viewing screen assembly 12 to the position shown in FIGS. 1 and 2 by inserting his fingers through the opening 18 and depressing the mirror 28 so that the protrusion 38 will be moved out of the notch 45 in the protrusion 44 of the housing 14. This will release the latching action for retention of the viewing screen within the projector housing 14 exhibited by the insertion of the protrusion 38 into the notch 45. The frame 20 may then be slidably moved outwardly to the fully extended viewing position shown in FIGS. 1 and 2.

As the frame 20 is being moved outwardly the protrusion 38 on the mirror 28 will clear the housing protrusion 44 and thus be permitted to be pivoted outwardly by the spring biasing means 32 to abut the stops 36 so that the mirror 28 will be operatively positioned in the projection path to reflect the movie image onto the projection screen 26. The spring biasing force 54 will cause the negative lens 48 to be pivoted to its operative position against stop 47 as the lens holder 46 is moved past the abutment surface 49 which extends from the housing protrusion 44. Further, as the mirror 28 is swung to its operative position, the biasing means 62 will be permitted to exert a force on the latching lever 60 so that when the frame 20 is moved to its outermost position, the prong 64 of the latching lever 60 will engage the notch 66 in the housing 14 to establish the viewing position of the personal viewing screen assembly 12, and to prevent its further movement out of the projector housing 14. With the viewing screen assembly 12 so positioned, projection of the movie film image by the projection lens 16 will be optically redirected to the projection screen 26 for personal previewing.

To return the personal viewing screen assembly 12 to its compact stored position, the operator merely presses the mirror 28 against the bias of the spring biasing means 32 until the forward end thereof engages the latching lever 60 and pivots the lever to remove the prong 64 from the notch 66 as is shown in dotted lines in FIG. 2. The frame 20 may then be slid into the housing 14 at which time the front guide surface 40 of the protrusion 38 will engage the guide surface 42 of the housing protrusion 44 to retain the mirror 28 in its stored position and the abutment surface 49 will cause the lens holder 46 to be pivoted to its stored position. When the frame 20 reaches its fully retracted stored position the protrusion 38 on the mirror will again engage the notch 45 of the housing protrusion 44 to position the frame 20 within the projector housing 14 and latch it in this position to prevent its accidental removal.

From the foregoing it is apparent that there is herein provided a novel compact slide-out personal viewing screen assembly for a motion picture projector which is stored within the projector without materially affecting the size or complexity thereof. The personal viewing screen enables the projector to be used either in a conventional manner to project a motion picture image on a remote screen or alternatively to project the image onto the personal viewing screen for viewing by the operator. The viewing screen assembly includes a frame slidable in the projector housing, the frame carrying a negative lens, a mirror and a rear projection viewing screen. The negative lens and the mirror are pivotally supported by the frame and are movable from a stored position to an operative position in the image projection path when the frame is moved from a stored position to a viewing position. Additionally, the interaction between the negative lens and mirror and the projector housing will cause the negative lens and mirror to be positioned in their stored position when the frame is returned to its stored position.

The invention has been described in detail with reference to preferred embodiments thereof, but it will be understood that variations and modifications can be effected within the spirit and scope of the invention.

We claim:

1. A projector having a housing, projection means for projecting an image along a predetermined path to a remote projection area, and an auxiliary viewing means for personal viewing, said auxiliary viewing means comprising:

a screen assembly, including a generally planar viewing screen, positioned to one side of and generally parallel to said predetermined path so as not to interfere with image projection along said path;

means mounting said assembly for movement, substantially parallel to the plane of said screen, between a storage position wherein said viewing screen is housed within said housing and an operative position wherein said viewing screen is external thereof; and optical means pivotally carried by said screen assembly for movement relative thereto between an inactive position lying generally parallel to said plane and to said one side of said predetermined path when said screen assembly is in said storage position, and an active position extending into said path at an angle to said plane so as to direct a projected image onto said screen when said screen assembly is in its operative position.

2. The auxiliary viewing means of claim 1 further including means responsive to movement of said screen assembly from said storage position to said operative position for moving said optical means from said inactive position to said active position.

3. The auxiliary viewing means of claim 1 further including means for latching said screen assembly in said active position.

4. The auxiliary viewing means of claim 3 wherein said means for latching said screen assembly in said active position is releasable by movement of said optical means to its inactive position.

5. The auxiliary viewing means of claim 1 further including means for latching said screen assembly in said inactive position.

6. The auxiliary viewing means of claim 5 wherein said means for latching said screen assembly in said inactive position includes a protuberance on said optical means and a notch in said projector housing, said notch being engaged by said protuberance when said screen assembly is in its storage position.

7. In a motion picture projector having a housing and a projection lens for projecting a motion picture image along a projection path, a compact personal viewing screen assembly comprising: a frame movable in said housing between a stored position and an operative position; a rear projection viewing screen carried by said frame; a lens unit movably mounted on said frame; means for biasing said lens unit to an operative position in said projection path from a stored position on said frame; a mirror movably mounted on said frame; and means for biasing said mirror to an operative position intersecting said projection path for reflecting the motion picture image projected along said path onto said viewing screen from a stored position on said frame; whereby when said frame is moved to its operative position, said lens unit and said mirror will be moved to their operative position, and when said frame is in its stored position, said lens unit and said mirror will be in their stored position.

8. The structure of claim 7 further including means for latching said frame in said operative position, said latching means comprising a latching lever pivotally mounted on said frame, said latching lever having a prong extending from one end thereof, a notch located in said housing and a means for biasing said prong into said notch when said frame is in said operative position.

9. The structure of claim 8, wherein said mirror has means for engaging said latching lever when said mirror is moved to said stored position so as to pivot said latching lever to disengage said prong thereof from said notch.

* * * * *